United States Patent [19]
McInnis et al.

[11] Patent Number: 5,322,914
[45] Date of Patent: Jun. 21, 1994

[54] AROMATIC POLYISOCYANURATE RESINS AND PROCESS THEREFOR

[75] Inventors: Edwin L. McInnis, Allentown; Thomas M. Santosusso; John E. Dewhurst, both of Macungie, all of Pa.

[73] Assignee: Air Products and Chemicals, Inc., Allentown, Pa.

[21] Appl. No.: 120,618

[22] Filed: Sep. 13, 1993

[51] Int. Cl.$^5$ .............................................. C08G 18/20
[52] U.S. Cl. ...................................... 528/52; 528/53; 528/54; 528/59
[58] Field of Search ........................ 528/52, 53, 54, 59

[56] References Cited

U.S. PATENT DOCUMENTS

| | | | |
|---|---|---|---|
| 4,033,908 | 7/1977 | Hopkins, Jr. et al. | 260/2.5 AW |
| 4,126,742 | 11/1978 | Carleton et al. | 528/57 |
| 4,602,049 | 7/1986 | Regelman | 521/129 |
| 4,855,383 | 8/1989 | Dammann et al. | 528/51 |
| 4,880,845 | 11/1989 | Moss et al. | 521/114 |
| 5,102,918 | 4/1992 | Moriya et al. | 521/110 |

*Primary Examiner*—Maurice J. Welsh
*Attorney, Agent, or Firm*—Russell L. Brewer; James C. Simmons; William F. Marsh

[57] ABSTRACT

The invention consists of a composition containing a chemically blocked trimerization catalyst and a polyurethane prepolymer resin or resins with reactive isocyanate groups. In the absence of heat, the catalyst is not active and the solution of catalyst in the resin undergoes no appreciable reaction for periods ranging from hours to weeks depending upon the composition and concentration of the catalysts and the structure and concentration of the isocyanate groups. When heat is applied to the mixture a trimerization reaction occurs which produces a crosslinked polyurethane network with utility as an elastomer or as an adhesive.

21 Claims, No Drawings

AROMATIC POLYISOCYANURATE RESINS AND PROCESS THEREFOR

TECHNICAL FIELD

This invention relates to one component aromatic polyisocyanurate resins and to a process for forming such resins by the trimerization of an isocyanate terminated prepolymer formed by the reaction of an aromatic diisocyanate and a polyol.

BACKGROUND OF THE INVENTION

The preparation of polyurethane and polyurethane/urea elastomers and adhesives traditionally requires the combination of isocyanates or isocyanate containing resins with crosslinking agents, e.g., polyamines or polyols, in precise ratios. That is because the reactivity of the combined isocyanates and isocyanate terminated prepolymers and the properties of the final polyurethane and polyurethane/urea vulcanizates are dependent upon the curative-resin ratio or stoichiometry. It is further recognized in the preparation of the polyurethane/urea elastomers that many of the presently used aromatic amine curatives have potential health and safety problems are crystalline solids which must be melted at high temperature and used in a molten state. A final problem in preparing polyurethane/urea elastomers is that the limited working time ("pot-life") available complicates the production of multiple castings and large parts that require large amounts of polyurethane/urea.

A number of approaches have been taken to overcome such problems as those mentioned above. These rely upon (a) the inhibition of the isocyanate, (b) the retardation of the curative, and (c) the blocking of catalysts which promote crosslinker-isocyanate reactions. Examples of the first approach (a), include the use of reaction products of isocyanates with oximes, phenols, or caprolactams. These products are stable at room temperature but revert to the starting components at higher temperatures. Examples of the second approach (b) include deactivated complexes of aromatic amines which form stable admixtures with isocyanate containing materials at room temperature. One commercially available material sold under the trademark, Caytur ® 21, is the 2.5:1 complex of methylenedianiline (MDA) with sodium chloride suspended in a carrier fluid. Heat destroys the weak complex and the liberated amine crosslinks the isocyanate containing material. An example of the third approach is a blend of a curative and an isocyanate which undergo a slow crosslinking reaction in the absence of a catalyst. A delayed catalyst, such as a thioalkanoic-tin complex, can be added. The three component blend has an extended working life at room temperature but rapidly cures upon heating.

The preparation of polyisocyanurate containing networks formed by the trimerization and chain extension of isocyanate terminated prepolymer in the presence of polyols is known. In this method the isocyanate group are caused to react to form the polyisocyanurate and this reaction can be effected through catalyst systems such as quaternary ammonium salts. The polyisocyanurate containing vulcanizates or networks are adapted for use in producing molded parts, laminating and impregnating applications as well as adhesives, coatings and so forth. Representative patents which disclose the trimerization of polyisocyanate resins are as follows:

U.S. Pat. No. 4,880,845 discloses the catalytic trimerization of aromatic isocyanate terminated prepolymers in the presence of short chain and long chain diols, e.g., butane diol and polyether polyols to rapidly produce polyisocyanurate and polyurethane containing products. Trimerization catalysts include the organic acid salts of 1,8-diaza-bicyclo(5,4,0)undec-7-ene. Ortho-carboxylic acid esters used as a catalyst component include ortho-carbonic acid tetraethylester, ortho-formic acid triethylester and the like. Controlled induction periods of a few seconds are noted.

U.S. Pat. No. 4,126,742 discloses a process for producing polyisocyanurate elastomers which comprises polymerizing aromatic polyisocyanates, e.g., methylene diisocyanate, with a small amount of polyol in the presence of a trimerization catalyst. Examples of trimerizing catalysts include tertiary amines such as N,N-dialkyl piperazine; 1,4-diazabicyclo[2.2.2.]octane and many more.

U.S. Pat. No. 4,033,908 discloses the preparation of polyisocyanurate foams by reacting a polyisocyanate in the presence of a trimerization catalyst and a blowing agent. Aromatic polyisocyanates such as polymethylenepolyphenylpolyisocyanate are trimerized in the presence of organic cyclic carbonates and liquid alkylene carbonates, tertiary amine metal salts as trimer catalysts.

U.S. Pat. No. 4,855,383 discloses a storage-stable, liquid composition comprising an isocyanate functional compound, an epoxy component, an alkylating agent and a tertiary amine catalyst precursor. The tertiary amine precursor forms a quaternary ammonium salt catalyst in situ for achieving crosslinking of the isocyanate via trimerization. In practice an isocyanate-functional prepolymer, either derived from aromatic or aliphatic polyisocyanate, is mixed with the epoxy component and alkylating agent. In the presence of a quaternary ammonium catalyst the isocyanate is trimerized to form a polyisocyanurate resin.

U.S. Pat. No. 5,102,918 discloses a modified organic polyisocyanate having an isocyanurate ring. The modified polyisocyanate is prepared from an aromatic polyisocyanate, such as toluenediisocyanate or diphenylmethanediisocyanate or isocyanate terminated prepolymers where the polyol is the polyether or polyester polyol. Catalysts used for effecting isocyanuration of the isocyanates include amines such as 2,4-bis(dimethylaminomethyl)pheny, N,N',N'',-tris(dimethylaminopropyl)hexahydrotriazine and diazabicycloundecene.

U.S. Pat. No. 4,602,049 discloses the use of amidinium salts as a catalyst for converting isocyanates to products having isocyanurate and carbodiimide linkages. In the examples, polyol was added with the amidinium catalyst for effecting isocyanurate and carbodiimide linkages in the resulting product.

SUMMARY OF THE INVENTION

The invention pertains to a one component curable polyisocyanurate forming resin consisting essentially of a chemically blocked trimerization catalyst and a polyisocyanate terminated polyurethane prepolymer having reactive isocyanate groups which is stable for extended periods at room temperature. The trimerization catalysts are amidine salts and the urethane prepolymers are the reaction product of an aromatic diisocyanate and a long chain polyol, e.g., a polyether or polyester polyol. In the substantial absence of components having active Zerewitinoff hydrogen atoms and in the absence of heat, the amidine salt is not active and a solution of the catalyst and resin generally undergoes no appreciable reaction for extended periods, e.g., weeks, depending upon the salt composition, the concentration of the catalyst and the structure and concentration of the isocyanate groups. When heat is applied to the mixture, a trimerization reaction occurs which produces a crosslinked polyisocyanurate vulcanizate or polymer having utility as an elastomer and as an adhesive.

There are several advantages associated with the trimerization catalyst and its processing characteristics in producing polyisocyanurate polymer. They include:

the ability to formulate a one component polyisocyanurate forming elastomer and/or adhesive from a polyurethane prepolymer formed by the reaction of an aromatic polyisocyanate and long chain polyether or polyester diol;

an ability to produce shelf stable, one component polyisocyanurate forming elastomers and adhesives;

an ability to produce elastomers and adhesives having excellent physical properties, particularly with respect to physical properties obtained with conventional one component systems; and, an ability to produce elastomeric and adhesive products without the necessity of metal catalysts.

DETAILED DESCRIPTION OF THE INVENTION

The polyisocyanate terminated urethane prepolymers suited for producing the polyisocyanurate elastomers and adhesives are those based upon aromatic polyisocyanates and long chain polyols. These polyisocyanates have from 2 to 3 isocyanate groups per molecule and examples include toluenediisocyanate (TDI), diphenylmethanediisocyanate (MDI), meta and para-phenylenediisocyanate (mPDI and pPDI), tolidinediisocyanate, and $C_{1-4}$ alkyl-substituted derivatives of these isocyanates. Aliphatic polyisocyanates have been ineffective candidates.

The long chain diols used for forming the isocyanate terminated urethane prepolymer include conventional polyether and polyester polyols. Typically, these polyols used in forming the adducts are aliphatic glycols and triols. Examples of glycols suited for producing the long chain diols are ethylene glycol, propylene glycol, butylene glycol, pentaerythritol, glycerol, and so forth. In preparing the long chain diols, ethylene oxide propylene oxide or tetramethylene oxide is reacted with these polyols to form the corresponding ethylene and propylene oxide adducts in an amount such that the resultant molecular weight of the long chain polyols will range from about 250 to 2,900. Molecular weights preferably range from about 800 to 2,000.

The long chain polyester polyols can be formed by reacting polybasic carboxylic acids with a variety of ethylene, propylene and butylene oxide adducts of alkylene glycols, triols and higher polyols. Typically the polyester polyols are reaction products of multifunctional carboxylic acids with glycols or the polyether polyols. Examples of carboxylic acids suited for producing the polyester polyols include oxalic acid, succinic acid maleic acid, adipic acid, phthalic acid, and the like. Molecular weights typically range from 250 to 2,900.

The polyisocyanate terminated urethane prepolymers are formed in a conventional manner whereby the aromatic polyisocyanate is reacted with the long chain polyol in proportions conventional to the art to provide residual isocyanate functionality. Typically the residual isocyanate functionality of the polyisocyanate terminated urethane prepolymer will range from about 1 to 15% or generally 3-9% by weight of the prepolymer.

The trimerization catalyst used in preparing the polyisocyanurate are monocyclic, acyclic and bicyclic amidine and guanidine salts. The amidines are represented by the formula:

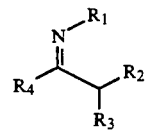

Guanidines are represented by the formula:

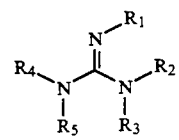

wherein in the above formulas $R_1$ is hydrogen, straight or branched, saturated or unsaturated hydrocarbon chains having up to 30 carbon atoms which may be substituted by groups unreactive with the isocyanate functionality of the polyisocyanate terminated prepolymer or combined to form a heterocyclic ring and $R_2$, $R_3$, $R_4$, and $R_5$ are straight or branched, saturated or unsaturated hydrocarbon chains having up to 30 carbon atoms which may be substituted by groups unreactive with the isocyanate functionality of the polyisocyanate terminated prepolymer or combined to form a heterocyclic ring.

Preferred bicyclic amidines and guanidines are represented by the formulae:

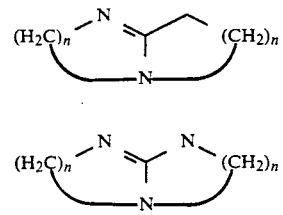

where n is 2 to 5.

Examples of monocyclic amidines and guanidines include 1,2-dimethyl-2-imidazoline; 1-methyl-2-phenyl-2-imidazoline; such as piperazines, such as 1-methyl-4-(2-tetrahydroazepinyl)piperazine; and 4-(2-tetrahydroazepinyl)-morpholine. Examples of guanidines include tetramethylguanidine, pentamethylguanidine, and cyclic guanidines. Examples of bicyclic amidines include 1,8-diaza-bicyclo(5,4.0)undecene-7 (DBU); 1,5-diaza-bicyclo(4,2,0)nonene-5 (DBN); 1,8-diaza-bicyclo(5,3,0)decene-7; 1,5-diaza-bicyclo(4,4,0)decene-5; 1,4-diaza-bicyclo(3,3,0)octene-4; diaza-bicycloheptanes, diaza-bicycloheptenes and 1,3,4,6,7,8-hexahydro-1-methyl-2H pyrimido [1,2-a] pyrimidine. The non-amidine amines such as triethylenediamine, tris(dimethylaminomethyl) phenol and bis(dimethylaminomethyl)phenol and the like salts, although alleged as being trimerization catalyst, are either insufficiently latent at room temperature or inactive at reaction temperature to produce the polyisocyanurate elastomers and adhesives contemplated herein. Additionally, they may require metallic promoters which detract from the thermal stability of the polymer.

The trimerization catalysts are Lewis and Bronsted salts of the above amidines and guanidines. The salts are formed by reacting the amidine or guanidine with a Lewis or Bronsted acid having a pKa of less than about 2. Acids having a pKa less than zero, e.g., sulfuric acid, stabilize the amidine salt to the extent that the prepolymer becomes substantially unreactive, even at elevated temperatures. Apparently, these acids do not dissociate sufficiently from the amidine or guanidine. Lewis and Bronsted acidic materials suited for forming the amidine salts include phenol, $C_{1-6}$ alkyl phenols, $C_{1-12}$ carboxylic acids and their substituted derivatives e.g., formic acid, acetic acid, propionic acid, butyric acid and dicarboxylic acids such as isophthalic acid and maleic acid; boric acid and $C_{1-6}$ trialkyl borates.

One of the keys to the development of the shelf stable, one component polyisocyanurate forming system was the substantial elimination of any Zerewitinoff hydrogen containing component, e.g., a hydroxyl providing component or other curative reactive with the polyisocyanate terminated urethane prepolymer. The pot life of the one component system is diminished substantially when a hydroxyl-providing component is present in combination with the amidine or guanidine catalyst system.

Catalyst loadings of 0.05 to 5 weight parts per hundred weight parts (phr) of polyurethane prepolymer are effective with the preferred level being 0.1 to 1.5. The catalysts generally are not effective when used at loadings of less than 0.05 phr.

The following examples are provided to illustrate various embodiment of the invention and are not intended to restrict the scope thereof.

EXAMPLE 1

Effect of Catalyst Loading

A series of one pot polyisocyanurate forming vulcanizates were prepared from polyisocyanate terminated polyurethanes having varying isocyanate content. The method of preparation consisted of combining the polyisocyanate terminated urethane prepolymer resin with an appropriate amount of catalyst at room temperature. In the case of extremely viscous or high melting materials, the temperatures of the components were kept as low as practical.

Specifically, the polyisocyanate terminated urethane prepolymer and trimerization catalyst, as specified, were thoroughly mixed, the mixture degassed, poured into a glass mold preheated to the cure temperature (100° C.), and cured for 4-16 hours. Samples were postcured 2 weeks at 70° F./50% RH prior to testing according to ASTM procedures. Stress-strain data were collected on an Instron 1120 Universal Test Machine. Table 1 sets forth catalyst type, amount and test results.

TABLE 1

Effect of Catalyst Loading on Airthane ® PET-75D (9.10% NCO) Trimer Properties

| Dabco ® SA-102* phr | 1.0 | 0.5 | 0.1 |
|---|---|---|---|
| Tensile Strength (psi) | 5750 | 2490 | 2000 |
| Youngs Modulus (psi) | 28600 | 20300 | 22400 |
| Elongation (%) | 132 | 89 | 54 |
| Hardness (A/D) (Shore) | 88/50 | 92/53 | 98/61 |
| Rebound (%) | 37 | 42 | 50 |
| Tear Die C (pli)** | 189 | 251 | 243 |

*Dabco ® SA-102 catalyst is the 2-ethylhexanoic salt of diazabicycloundecene (DBU). Airthane ® PET-75D prepolymer is a PTMEG/TDI prepolymer.
**pli refers to pounds per linear inch.

Unheated samples stored at room temperature remained liquid for days or weeks. The results in Table 1 show that the polyurethane prepolymer at catalyst levels ranging from 0.1 to 1 weight parts per hundred weight parts (phr) prepolymer can be converted to polyisocyanurate elastomers having good physical properties. These elastomers are harder than typical butanediol cured polyurethanes and have good elasticity and elongation compared to amine-cured polyurethanes.

EXAMPLE 2

Effect of Catalyst Type and Residual Diisocyanate Content

The procedure of Example 1 was followed with catalyst loadings of 0.10 phr. Tables 2-4 set forth conditions and results.

TABLE 2

Effect of Catalyst Type on Airthane PET-90A (3.60% NCO) Trimer Properties

| Dabco Catalyst | SA-1* (1) | SA-102 (2) | SA-610/50* (3) |
|---|---|---|---|
| Tensile Strength (psi) | 287 | 289 | 257 |
| Youngs Modulus (psi) | 863 | 1056 | 747 |
| Elongation (%) | 53 | 48 | 40 |
| Hardness (A/D) (shore) | 66/21 | 67/23 | 66/22 |
| Rebound (%) | 67 | 66 | 68 |
| Tear Die C (pli) | 30 | 30 | 13 |

TABLE 3

Effect of Catalyst Type on Airthane PET-95A (6.20% NCO) Trimer Properties

| Dabco Catalyst | SA-1 (1) | SA-102 (2) | SA-610/50 (3) |
|---|---|---|---|
| Tensile Strength (psi) | 602 | 573 | 543 |
| Youngs Modulus (psi) | 1406 | 1355 | 1516 |
| Elongation (%) | 72 | 70 | 54 |
| Hardness (A/D) (shore) | 76/25 | 76/25 | 76/25 |
| Rebound (%) | 34 | 34 | 35 |
| Tear Die C (pli) | 41 | 34 | 29 |

TABLE 4

Effect of Catalyst Type on Airthane PET-70D (8.25% NCO) Trimer Properties

| Catalyst | SA-1 (1) | SA-102 (2) | SA-610/50 (3) |
|---|---|---|---|
| Tensile Strength (psi) | 1807 | 1704 | 1722 |
| Youngs Modulus (psi) | 10590 | 8860 | 10870 |
| Elongation (%) | 68 | 68 | 59 |
| Hardness (A/D) (shore) | 87/40 | 89/44 | 94/46 |
| Rebound (%) | 38 | 39 | 43 |
| Tear Die C (pli) | 108 | 107 | 103 |

The results show the effect of increased levels of isocyanate in the polyurethane prepolymer. As one might expect, physical properties improve in terms of tensile strength, Young's modulus, hardness and tear strength with increasing levels of isocyanate in the polyurethane prepolymer. This is probably due to the fact that with increasing levels of isocyanate in the resin there is increased isocyanurate formation in the final vulcanizate.

EXAMPLE 3

Polyisocyanurate from TDI-Polyesterpolyol Prepolymers

The procedure of Example 1 was repeated using TDI-Polyester prepolymers. Table 5 sets forth the conditions and results.

TABLE 5

TDI-Polyester Trimer Properties (SA-102 Catalyst at 0.25 phr)

| Prepolymer | Cyanaprene ® A9 | Cyanaprene D5QM | Cyanaprene D6 | Cyanaprene D7 |
|---|---|---|---|---|
| % NCO | 4.34 | 5.03 | 5.74 | 6.64 |
| Tensile Strength (psi) | 2460 | 2100 | 4290 | 5890 |
| Youngs Modulus (psi) | 3100 | 2515 | 7840 | 9570 |
| Elongation (%) | 340 | 247 | 259 | 237 |
| 100% Modulus (psi) | 320 | 500 | 630 | 930 |
| 200% Modulus (psi) | 560 | 1100 | 1570 | 3045 |
| 300% Modulus (psi) | 1265 | — | — | — |
| Hardness (A/D) (shore) | 62/21 | 73/30 | 79/36 | 93/55 |
| Rebound (%) | 11 | 12 | 20 | 42 |
| Tear Die C (psi) | 146 | 141 | 180 | 296 |
| Compression Set (%) | 2 | 3 | 3 | 4 |

Cyanaprene prepolymers are reaction products of toluenediisocyanate and polyester polyols.

The results show that when the ester based materials are compared to ether based resins of comparable NCO content (Table 3 vs. Table 5), the former are higher in modulus and tear strength. They also exhibit excellent compression set. This is probably due to increased chain crystallinity. However, with both systems shelf stability ranges from to weeks.

EXAMPLE 4

Polyisocyanurate from MDI-Polyether Prepolymers

The properties of MDI-ether vulcanizates were determined in accordance with the general procedure of Example 1. Table 6 sets forth the conditions and results.

TABLE 6

MDI-Polyether Trimer Properties (SA-102 Catalyst at 0.25 phr)

| Resin | Polathane ® SME-P2 | Baytec ® ME090 | Polathane AX4 | Baytec ME050 |
|---|---|---|---|---|
| % NCO | 13.1 | 9.83 | 6.81 | 6.06 |
| Tensile Strength (psi) | 5340 | 1840 | 1110 | 1155 |
| Youngs Modulus (psi) | 116,000 | 18730 | 6340 | 6754 |
| Elongation (%) | 13 | 22 | 44 | 73 |
| Hardness (A/D) (shore) | 97/73 | 94/50 | 88/37 | 87/42 |
| Rebound (%) | 45 | 59 | 53 | 52 |
| Tear Die C (psi) | 155 | 113 | 109 | 83 |
| Compression Set (%) | NA | 16 | 8 | 8 |

Methylenedi(phenylisocyanate) polyether (MDI) based resins.
Polathane ® SME-P2 MDI resin had 13.1% NCO.
Polathane ® AX-4 MDI resin as 6.81% NCO.
Baytec ® ME 050 MDI resin has 6.06% NCO.
Baytec ME 090 MDI resin has 9.83% NCO.

The results show that polyisocyanurate resins can be formed by trimerizing methylenedi(phenylisocyanate) polyether prepolymers into the polyisocyanurate elastomers. As with the TDI based prepolymers, these formulations have a long shelf life.

EXAMPLE 5

Polyisocyanurate from pPDI-PTMG Prepolymers

The procedure of Example 1 was repeated, except pPDI functionalized materials were used. Table 7 sets forth conditions and results.

TABLE 7 pPDI-Polyether Trimer Properties (SA-102 Catalyst at 0.25 phr)

| Resin | Ultracast PE-35 | Ultracast PE-60 |
|---|---|---|
| % NCO | 3.58 | 5.84 |
| Tensile Strength (psi) | 320 | 800 |
| Youngs Modulus (psi) | 936 | 1160 |
| 100% Modulus (psi) | | 765 |
| Elongation (%) | 52 | 102 |
| Hardness (A/D) (shore) | 68/25 | 73/29 |
| Rebound (%) | 2 | 35 |
| Tear Die C (pli) | 72 | 63 |
| Compression Set (%) | 1 | 2 | pPDI Based Resins
Ultracast ® PE-35 pPDI-PTMG polyether based prepolymer has 3.58% NCO.
Ultracast PE-60 pPDI-PTMG polyether based prepolymer has 5.84% NCO.

The results show that excellent properties of a polyisocyanurate polymer can be obtained via the trimerization of a polyurethane prepolymer based upon pPDI (para-phenylenediisocyanate).

EXAMPLE 6

Polyisocyanurate Adhesives

For adhesive applications, metal coupons were sandblasted and degreased prior to use. A portion of the resin-catalyst blend was applied to one coupon and a bond line of 5 mil was maintained by placing silica beads on the open adherend. The second coupon was placed on the first with an overlap of 0.5" and finger pressure was applied. The coupons were placed in a 100° C. oven for a period of 4-16 hours. The coupons were tested using established procedures. The conditions and results are set forth in Table 8.

TABLE 8

TDI-Polyester Trimer Lap Shear Properties
(SA-102 Catalyst at 0.25 phr)

| Resin | Cyana-prene A9 | Cyana-prene D5QM | Cyana-prene D6 | Cyana-prene D7 |
|---|---|---|---|---|
| % NCO | 4.34 | 5.03 | 5.74 | 6.64 |
| Shear Strength (psi) | 300 | 640 | 710 | 1400 |

The results show that the TDI-polyester trimer catalyzed with diazabicycloundecene-2-ethylhexanoic acid resulted in polyisocyanurate vulcanizates having good adhesive properties as determined by shear strength. Especially useful is the Cyanaprene D7 resin which has the highest % NCO content of the prepolymers used.

EXAMPLE 7

Comparative Catalytic Systems

The procedure of Example 1 was repeated except that a system containing active Zerewitinoff hydrogen compounds were tested for comparative evaluation. The comparison was also made between a low free isocyanate monomer containing resin (Airthane PET 75D) and a conventional, high free isocyanate monomer resin (Adiprene® L315). The conditions and results are set forth in Table 9.

TABLE 9

Properties of Catalyst Polyurethanes.

| | FORMULATION | | | | | |
|---|---|---|---|---|---|---|
| RESIN | Adiprene ® L-315 | | | Airthane PET75D | | |
| RESIN % NCO | 9.40% | | | 9.05% | | |
| RESIN E.W. | 447.0 | | | 464.3 | | |
| Sample | A | B | C | D | E | F |
| POLYOL CURATIVE | None | PTMG | BDO | None | PTMG | BDO |
| CURATIVE E.W. | | 490 | 45 | | 490 | 45 |
| CATALYST | | | | SA-102 | | |
| CATALYST-CHARGE (PHR) | 0.25 | 0.25 | 0.25 | 0.25 | 0.25 | 0.25 |
| PREPOLYMER | 100 | 100 | 100 | 100 | 100 | 100 |
| POLYOL CURATIVE (PHR) | 0.00 | 54.75 | 5.03 | 0.00 | 52.72 | 4.85 |
| | | | | Results | | |
| POT LIFE @ 22° C. | >40 days | 39.9 min. | 15.5 min. | >40 days | 80.9 min. | 16.9 min. |
| PROPERTIES | | | | | | |
| TENSILE (PSI) | 2690 | 833 | | 2730 | 590 | 3530 |
| YOUNG'S MOD. PSI | 39820 | 750 | | 22350 | 592 | 5880 |
| STRESS AT 100% PSI | NA | 345 | | NA | 320 | 905 |
| STRESS AT 200% PSI | NA | 624 | | NA | 560 | 3270 |
| STRESS AT 300% PSI | NA | NA | | NA | NA | NA |
| ELONGATION (%) | 59 | 236 | | 91 | 205 | 202 |
| TEAR DIE-C (PLI) | 271 | 136 | | 315 | 123 | 195 |
| SPLIT TEAR (PLI) | 30 | 13 | | 47 | 9 | 56 |
| REBOUND (%) | 57 | 30 | | 51 | 34 | 29 |
| HARDNESS (A/D) | 97/62 | 63/23 | | 97/59 | 61/20 | 84/42 |
| COMP. SET (%) | NA | 3 | — | NA | 1 | — |

PTMG is poly(tetramethyleneglycol).
BDO is 1,4-butanediol.

The results show that the systems cured with the diazabicycloundecene catalyst in the absence of polyoy curative (Samples A and D) exhibit extended shelf life and constitute a shelf-stable, one component system. Each of the resin systems containing polyol (Samples B, C, E and F), and particularly the short chain diol BDO (Samples C and F) had too short a pot life to serve as a "one component system." It should also be noted that the tensile, tear, and hardness values were greater for the one component system. Formulation C was too viscous to mold using conventional techniques and no physical properties were determined.

EXAMPLE 8

The procedure of Example 1 was repeated, except a prepolymer terminated with isophorone diisocyanate (IPDI), an aliphatic isocyanate, was employed. After extended heating at 100° C., no evidence of reaction was observed.

EXAMPLE 9

The procedure of Example 1 was repeated, except acid salts of tetramethylguanidine were used as the latent trimerization catalysts. These materials were stable for periods of weeks at room temperature, but exhibited the following gel times at 100° C. (minutes).

TABLE 10

Gel Times of Guanidine Salts with
PET 70D-TDI Prepolymers at 100° C.

| Base | Acid | Pot Life @ 100° C. (min) |
|---|---|---|
| DBU | Ethylhexanoic | 9 |
| DBU | Trichloroacetic | 9 |
| Tetramethylguanidine | Ethylhexanoic | 57 |
| Tetramethylguanidine | Trichloroacetic | 300 |

The pot life of the guanidine salts is quite long as compared to the amidine, DBU.

What is claimed is:

1. A polyisocyanurate forming resin composition consisting essentially of:
    an aromatic polyisocyanate/long chain polyol urethane prepolymer having pendent isocyanate groups, and
    a catalytically effective amount of an amidine or guanidine salt of Lewis and Bronsted acids where the amidine and guanidine is represented by the formulae:

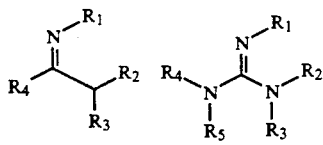

wherein $R_1$ is H or a straight or branched, saturated or unsaturated hydrocarbon chains, having up to 30 carbon atoms which may be substituted by groups unreactive with the isocyanate functionality of the polyisocyanate terminated prepolymer or combined to form a heterocyclic ring and $R_2$, $R_3$, $R_4$, and $R_5$ are straight or branched, saturated or unsaturated hydrocarbon chains, having up to 30 carbon atoms which may be substituted by groups unreactive with the i socyanate functionality of the polyisocyanate terminated prepolymer or combined to form a heterocyclic ring.

2. The composition of claim 1 wherein the amidine or guanidine is a bicyclic heterocycle represented by the formula:

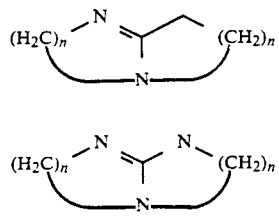

wherein n is 2 to 5.

3. The composition of claim 2 wherein the bicyclic heterocycle is a bicyclic amidine and is selected from the group consisting of 1,8-diaza-bicyclo(5,4.0)undecene-7; 1,5-diaza-bicyclo(4,2,0)nonene-5; 1,8-diaza-bicyclo(5,3,0)decene-7; 1,5-diaza-bicyclo(4,4,0)decene-5; and 1,4-diaza-bicyclo(3,3, 0) octene-4.

4. The composition of claim 3 wherein the Lewis or Bronsted acid is selected from the group consisting of phenol and alkyl substituted phenols, substituted and unsubstituted $C_1$–$C_{12}$ monocarboxylic acids, trichloroacetic acid, boric acid and trialkylborates.

5. The composition of claim 4 wherein the aromatic diisocyanate is selected from the group consisting of toluenediisocyanate, methane di(phenylisocyanate) and meta and para-phenylenediisocyanate.

6. The composition of claim 5 wherein the bicyclic amidine is 1,8-diaza-bicyclo(5,4.0)undecene-7 and is present as a salt in an amount from 0.05 to 5 weight parts per hundred weight parts of the polyurethane prepolymer.

7. The composition of claim 6 wherein the long chain polyol used to prepare the urethane prepolymer is poly (tetramethylene) glycol or polypropylene glycol or a polyglycoladipate ester having a molecular weight of from 250 to 2900.

8. The composition of claim 7 wherein the aromatic diisocyanate is toluenediisocyanate and the acid is selected from the group consisting of phenol, ethylhexanoic, trichloroacetic, and formic acid.

9. A process for preparing a polyisocyanurate vulcanizate which comprises:
crosslinking an aromatic isocyanate-terminated urethane prepolymer comprised of the reaction product of an aromatic polyisocyanate and a long chain polyol in the substantial absence of compounds having active Zerewitinoff hydrogen atoms utilizing an acid-blocked trimerization catalyst comprised of the reaction product of a bicyclic amidine or guanidine and a Lewis or Bronsted acid, said amidine and guanidine represented by the formulae:

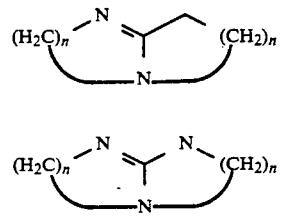

wherein n is 2 to 5.

10. The process of claim 9 where the aromatic polyisocyanate is toluenediisocyanate, methane di(phenylisocyanate) and meta and para-phenylenediisocyanate.

11. The process of claim 10 where the acid-blocked trimerization catalyst is formed from a bicyclic amidine selected from the group consisting of 1,8-diazabicyclo(5,4,0)undecene-7; 1,5-diazabicyclo(4,2,0)nonene-5; 1,8-diazabicyclo(5,3,0)decene-7; 1,5-diazabicyclo(4,4,0)decene-5; and 1,4-diazabicyclo(3,3,0)octene-4.

12. The process of claim 11 where the Lewis or Bronsted acid is chosen from the group consisting of phenol and alkyl substituted phenols, substituted and unsubstituted $C_1$–$C_{12}$ monocarboxylic acids, trichloroacetic acid, boric acid and trialkylborates.

13. The process of claim 12 where the polyisocyanate is diphenylmethanediisocyanate.

14. The process of claim 13 where the crosslinking is carried out at a temperature between 50° C. and 200° C.

15. A polyisocyanurate vulcanizate composition consisting essentially of:
the trimerization product of an aromatic polyisocyanate/long chain polyurethane prepolymer having pendent isocyanate groups, and
a catalytically effective amount of an amidine or guanidine salt of Lewis or Bronsted acids where the amidine and guanidine is represented by the formulae:

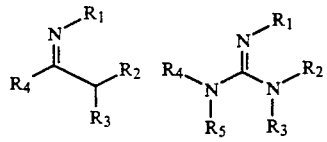

wherein $R_1$ is H or straight or branched, saturated or unsaturated hydrocarbon chains, having up to 30 carbon atoms which may be substituted by groups unreactive with the isocyanate functionality of the polyisocyanate terminated prepolymer or combined to form a heterocyclic ring and $R_2$, $R_3$, $R_4$, and $R_5$ are straight or branched, saturated or unsaturated hydrocarbon chains, having up to 30 carbon atoms which may be substituted by groups unreactive with the isocyanate functionality of the polyisocyanate terminated prepolymer or combined to form a heterocyclic ring.

16. The composition of claim 15 wherein the amidine or guanidine is a bicyclic heterocycle represented by the formula:

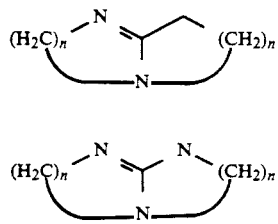

wherein n is 2 to 5.

17. The composition of claim 16 wherein the bicyclic heterocycle is a bicyclic amidine and is selected from the group consisting of 1,8-diaza-bicyclo(5,4.0)undecene-7; 1,5-diaza-bicyclo(4,2,0)nonene-5; 1,8-diaza-bicyclo(5,3,0)decene-7; 1,5-diaza-bicyclo(4,4,0)decene-5; and 1,4-diaza-bicyclo(3,3,0) octene-4.

18. The composition of claim 17 wherein the long chain polyol used to prepare the urethane prepolymer is poly (tetramethylene) glycol or polypropylene glycol having a molecular weight of from 250 to 2900.

19. The polyisocyanurate vulcanizate of claim 15 wherein the bicyclic amidine is 1,8-diaza-bicyclo(5,4.-0)undecene-7 and is present as a salt in an amount of from 0.05 to 5 weight parts per hundred weight parts of the polyurethane prepolymer.

20. The polyisocyanurate vulcanizate of claim 19 wherein the aromatic diisocyanate is selected from the group consisting of toluenediisocyanate, methane di(-phenylisocyanate) and para-phenylenediisocyanate.

21. The composition of claim 20 wherein the Lewis or Bronsted acid is selected from the group consisting of phenol, ethylhexanoic, trichloroacetic, and formic acid.

* * * * *